United States Patent
Hsieh

(10) Patent No.: US 7,653,230 B2
(45) Date of Patent: Jan. 26, 2010

(54) METHODS AND SYSTEMS FOR IMAGE RECONSTRUCTION USING LOW NOISE KERNEL

(75) Inventor: Jiang Hsieh, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 814 days.

(21) Appl. No.: 11/358,242

(22) Filed: Feb. 21, 2006

(65) Prior Publication Data

US 2007/0196006 A1  Aug. 23, 2007

(51) Int. Cl.
*G06K 9/00* (2006.01)
(52) U.S. Cl. ...................... 382/131; 382/275
(58) Field of Classification Search .......... 382/128, 382/131, 154, 275; 378/4, 8, 62
See application file for complete search history.

(56) References Cited

U.S. PATENT DOCUMENTS

| | | | |
|---|---|---|---|
| 6,115,487 A | 9/2000 | Toth et al. | 382/131 |
| 6,134,292 A | 10/2000 | Hsieh | 378/4 |
| 6,215,841 B1 | 4/2001 | Hsieh | 378/8 |
| 6,233,308 B1 | 5/2001 | Hsieh | 378/62 |
| 6,408,042 B1 | 6/2002 | Hsieh | 378/4 |
| 6,421,411 B1 | 7/2002 | Hsieh | 378/4 |
| 6,438,195 B1 | 8/2002 | Hsieh | 378/4 |
| 6,507,632 B1 | 1/2003 | Hsieh | 378/4 |
| 6,529,574 B1 | 3/2003 | Hsieh | 378/4 |
| 6,570,951 B1 | 5/2003 | Hsieh | 378/4 |
| 2003/0031289 A1 | 2/2003 | Hsieh | 378/4 |
| 2005/0265590 A1* | 12/2005 | Li et al. | 382/131 |
| 2006/0067457 A1* | 3/2006 | Zamyatin et al. | 378/4 |

* cited by examiner

*Primary Examiner*—Andrew W Johns
(74) *Attorney, Agent, or Firm*—Armstrong Teasdale LLP

(57) ABSTRACT

Methods and systems for a system for visualizing relatively small structures within an object are provided. The system includes an image acquisition sub-system for acquiring a dataset for a volume of interest and processor for generating image data from the acquired data wherein the processor is programmed to execute a high resolution filter kernel algorithm that includes a weighting factor applied to a ramp filter that scales relatively high frequency regions of the image dataset by a factor greater than one. The high resolution filter kernel algorithm also includes a windowing function applied to the weighted ramp filter that facilitates reducing aliasing artifacts in reconstructed images generated from the image dataset.

31 Claims, 5 Drawing Sheets

METHODS AND SYSTEMS FOR IMAGE RECONSTRUCTION USING LOW NOISE KERNEL

BACKGROUND OF THE INVENTION

This invention relates generally to computed tomography (CT) imaging and more particularly, to a high-resolution kernel with low noise and low aliasing artifacts.

In some known clinical applications, it is desirable to be able to visualize small structures inside a human body. For example, in an Inner Auditory Canal (IAC) examination, radiologists examine small bony structures to discover abnormalities. Traditionally, such examinations are performed using high-resolution kernels, for example, a bone kernel or edge kernel, during the tomographic reconstruction process. The kernel provides that high frequency contents in the projection are enhanced such as by applying a polynomial weighting function to the original filter kernel, so that the high-frequency regions are scaled by a factor greater than one as set forth below:

$$G(f) = w(f) \cdot R(f), \text{ where} \tag{1}$$

f is a frequency variable,

R is the original "Ramp" filter, and w is the weighting function.

BRIEF DESCRIPTION OF THE INVENTION

In one embodiment, a system for visualizing relatively small structures within an object includes an image acquisition sub-system for acquiring a dataset for a volume of interest and processor for generating image data from the acquired data wherein the processor is programmed to execute a high resolution filter kernel algorithm that includes a weighting factor applied to a ramp filter that scales relatively high frequency regions of the image dataset by a factor greater than one. The high resolution filter kernel algorithm also includes a windowing function applied to the weighted ramp filter that facilitates reducing aliasing artifacts in reconstructed images generated from the image dataset.

In another embodiment, an imaging system includes an image acquisition portion for acquiring data, a controller configured to control the image acquisition portion, and a processor configured to receive a dataset for an object that includes relatively small structures, the processor is further programmed to process the dataset using a high resolution filter kernel algorithm including a weighting factor applied to a ramp filter that scales relatively high frequency regions of the image dataset by a factor greater than one. The filter kernel algorithm also includes a windowing function applied to the weighted ramp filter that facilitates reducing aliasing artifacts in reconstructed images generated from the image dataset.

In yet another embodiment, a method of visualizing relatively small structures within an object includes receiving a dataset for a volume of interest and applying a high resolution filter kernel algorithm to the dataset wherein the high resolution filter kernel algorithm includes a weighting factor and a windowing function. The weighting factor is applied to a ramp filter that scales relatively high frequency regions of the dataset by a factor greater than one and the windowing function is applied to the weighted ramp filter such that aliasing artifacts in reconstructed images generated from the image dataset are facilitated being reduced.

DETAILED DESCRIPTION OF THE INVENTION

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Also as used herein, the phrase "reconstructing an image" is not intended to exclude embodiments of the present invention in which data representing an image is generated but a viewable image is not. Therefore, as used herein the term, "image," broadly refers to both viewable images and data representing a viewable image. However, many embodiments generate (or are configured to generate) at least one viewable image.

Figure 1:
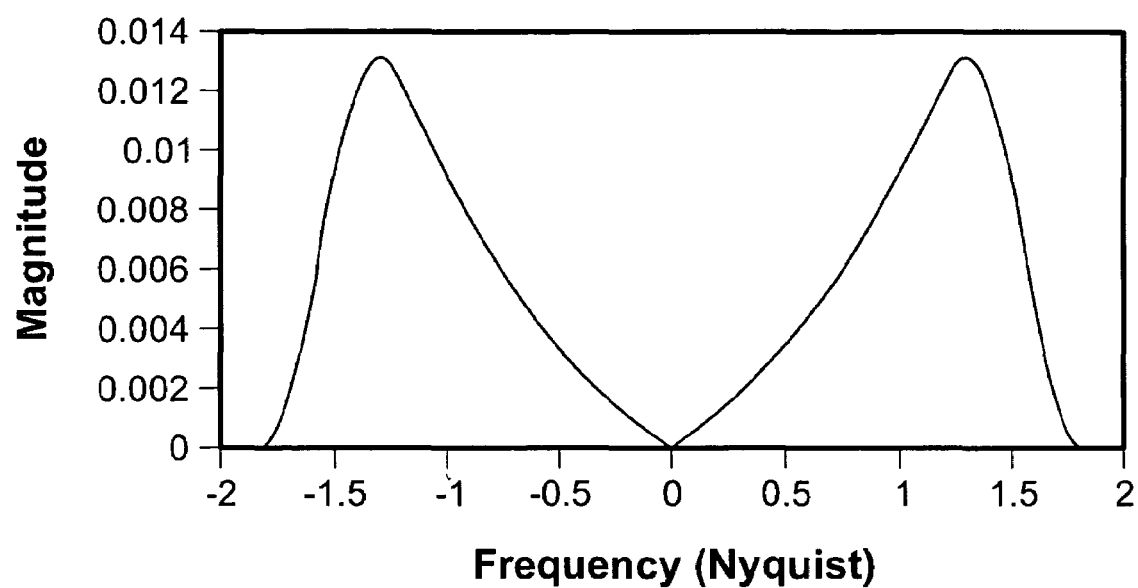
FIG. 1 illustrates an exemplary edge kernel function.

FIG. 1 illustrates an exemplary edge kernel function. In this example, the cutoff frequency of the kernel is 1.8 times the Nyquist value of a single projection. The exemplary edge kernel function design produces high resolution images. However, it also may produce reconstructed images with aliasing artifacts.

Figure 2:
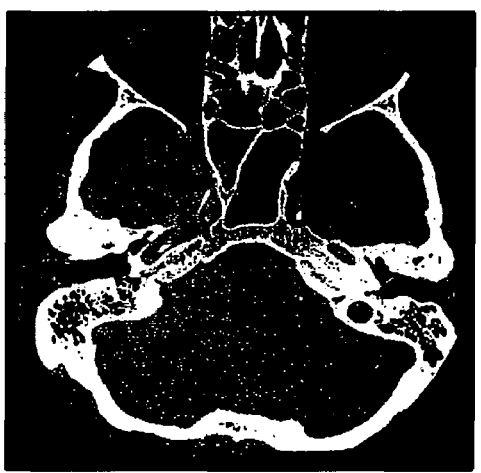
FIG. 2 illustrates an exemplary reconstructed head image acquired with full scan (2π gantry rotation) using the edge kernel shown in FIG. 1.

FIG. 2 illustrates an exemplary reconstructed head image acquired with full scan (2π gantry rotation) using the edge kernel shown in FIG. 1. Aliasing artifacts are clearly visible.

Figure 3:
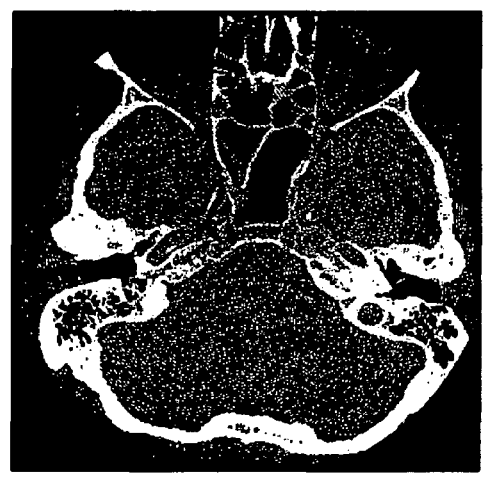
FIG. 3 illustrates an exemplary reconstructed head image acquired with a half-scan acquisition (π+fan angle) using the edge kernel shown in FIG. 1.

FIG. 3 illustrates the exemplary reconstructed head image acquired with a half-scan acquisition (π+fan angle) using the edge kernel and aliasing artifacts become significantly magnified such that the image is un-useable from a clinical point of view.

Figure 4:
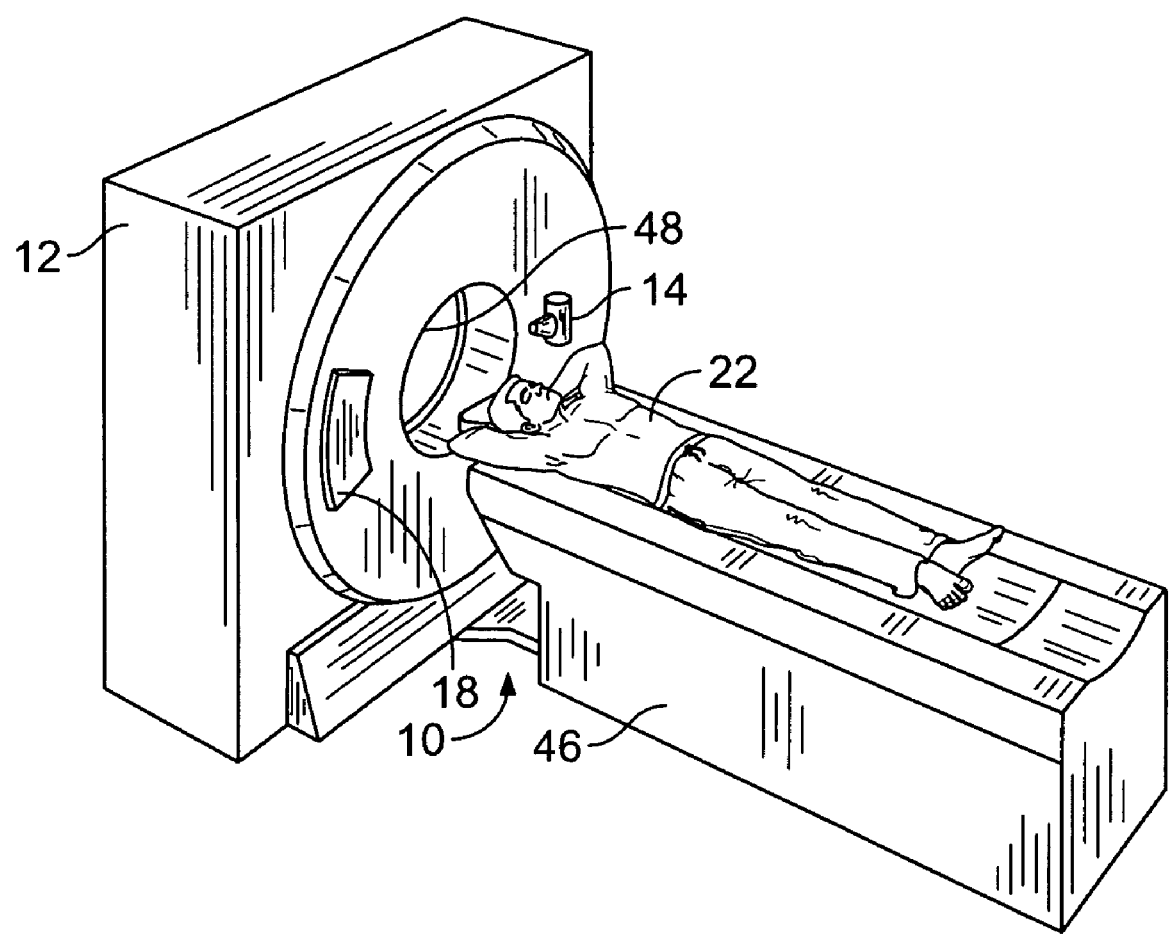
FIG. 4 is a pictorial view of a multi slice volumetric CT imaging system.
Figure 5:
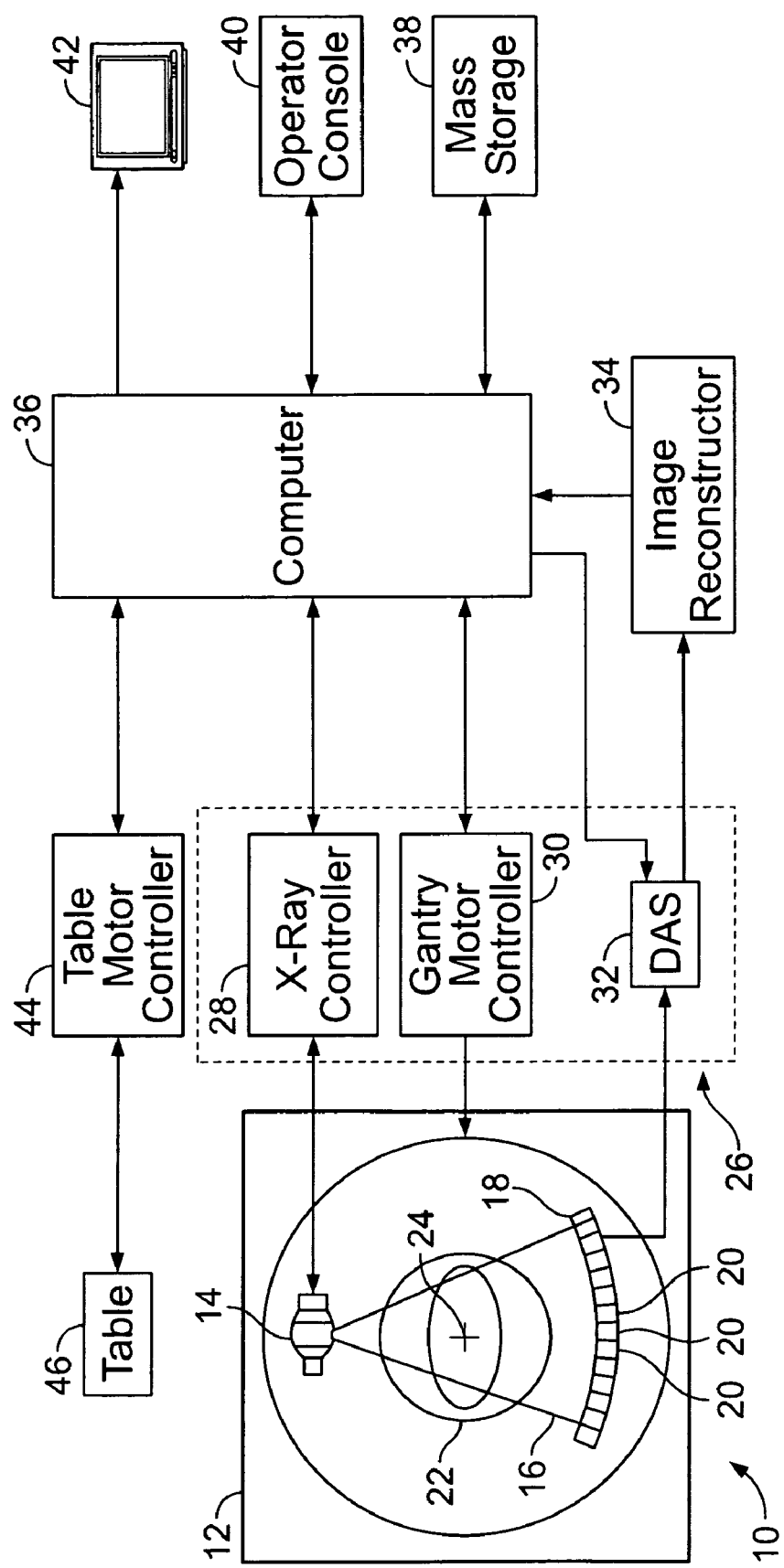
FIG. 5 is a block schematic diagram of the multi slice volumetric CT imaging system illustrated in FIG. 4.

FIG. 4 is a pictorial view of a multi slice volumetric CT imaging system 10. FIG. 5 is a block schematic diagram of system 10 illustrated in FIG. 4. In the exemplary embodiment, a computed tomography (CT) imaging system 10 is shown as including a gantry 12 representative of a "third generation" CT imaging system. Gantry 12 has a radiation source 14 that projects a cone beam 16 of x-rays toward a detector array 18 on the opposite side of gantry 12.

Detector array 18 is formed by a plurality of detector rows (not shown) including a plurality of detector elements 20, which together sense the projected x-ray beams that pass through an object, such as a medical patient 22. Each detector element 20 produces an electrical signal that represents the intensity of an impinging radiation beam and hence the attenuation of the beam as it passes through patient 22. An imaging system 10 having a multislice detector array 18 is capable of providing a plurality of images representative of patient 22. Each image of the plurality of images corresponds to a separate "slice" of the volume. The "thickness" or aperture of the slice is dependent upon the thickness of the detector rows, system geometry, x-ray focal spot size, and the reconstruction algorithm.

During a scan to acquire radiation projection data, gantry 12 and the components mounted thereon rotate about an axis of rotation 24. FIG. 5 shows only a single row of detector elements 20 (i.e., a detector row). However, multislice detector array 18 includes a plurality of parallel detector rows of detector elements 20 such that projection data corresponding to a plurality of quasi-parallel or parallel slices can be acquired simultaneously during a scan.

Rotation of gantry 12 and the operation of radiation source 14 are governed by a control mechanism 26 of CT system 10. Control mechanism 26 includes a radiation controller 28 that provides power and timing signals to radiation source 14 and a gantry motor controller 30 that controls the rotational speed and position of gantry 12. A data acquisition system (DAS) 32 (sometimes referred to herein as a sub-system) in control mechanism 26 samples analog data from detector elements 20 and converts the data to digital signals for subsequent processing. An image reconstructor 34 receives sampled and digitized radiation data from DAS 32 and performs high-speed image reconstruction. The reconstructed image is applied as an input to a computer 36, which stores the image in a mass storage device 38.

Computer 36 also receives commands and scanning parameters from an operator via console 40 that has a keyboard. An associated display 42 allows the operator to observe the reconstructed image and other data from computer 36. The operator supplied commands and parameters are used by computer 36 to provide control signals and information to DAS 32, radiation controller 28, and gantry motor controller 30. In addition, computer 36 operates a table motor controller 44 that controls a motorized table 46 to position patient 22 in gantry 12. Particularly, table 46 moves portions of patient 22 through gantry opening 48.

In one embodiment, computer 36 includes a device 50, for example, a floppy disk drive or CD-ROM drive, for reading instructions and/or data from a computer-readable medium 52, such as a floppy disk or CD-ROM. In another embodiment, computer 36 executes instructions stored in firmware (not shown). Generally, a processor in at least one of DAS 32, reconstructor 34, and computer 36 shown in FIG. 5 is programmed to execute the processes described below. Of course, the method is not limited to practice in CT system 10 and can be utilized in connection with many other types and variations of imaging systems. In one embodiment, Computer 36 is programmed to perform functions described herein, accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits.

Set forth below is a description of an exemplary multislice CT system in accordance with one embodiment of the present invention. Although one embodiment of the system is described in detail below, it should be understood that many alternative embodiments of the inventions are possible. For example, although one particular detector and one particular pre-patient collimator are described, other detectors or collimators could be used in connection with the system, and the present invention is not limited to practice with any one particular type of detector. Specifically, the detector described below includes a plurality of modules and each module includes a plurality of detector cells. Rather than the specific detector described below, a detector which has non-segmented cells along the z-axis, and/or a detector which has multiple modules with multiple elements along the x-axis and/or z-axis joined together in either direction to acquire multislice scan data simultaneously, can be utilized. Generally, the system is operable in a multislice mode to collect one or more slices of data. Axial and helical scans can be performed with the system, and cross section images of a scanned object can be processed, reconstructed, displayed, and/or archived.

Figure 6:
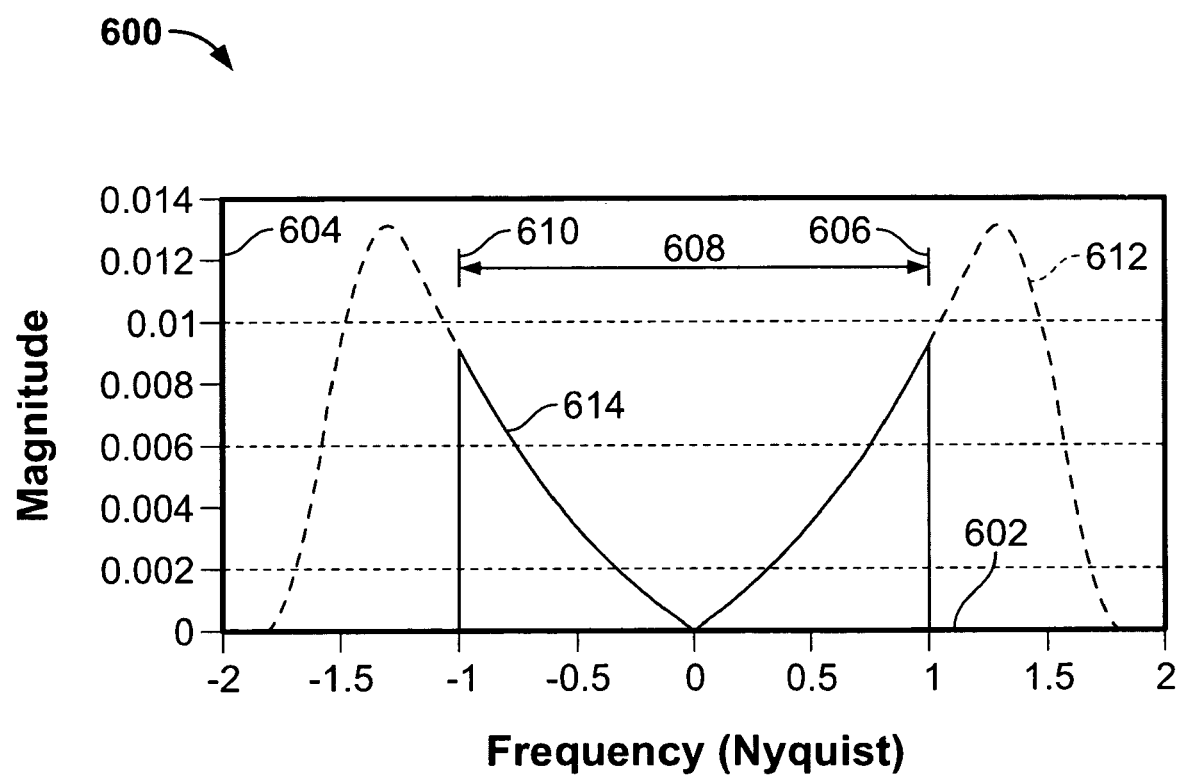
FIG. 6 is a graph 600 of an exemplary image reconstruction kernel that may be used with the system shown in FIG. 4.

Although various embodiments are described above relative to a CT system, other medical imaging modalities, such as nuclear medicine, single positron emission tomography (SPECT), positron emission tomography (PET), nuclear magnetic resonance imaging (MRI), static X-ray imaging, dynamic (Fluoroscopy) X-ray imaging, and multimodality combinations thereof may also benefit form the methods described herein and the use of the present invention is contemplated with respect to these modalities FIG. 6 is a graph 600 of an exemplary image reconstruction kernel that may be used with system 10 (shown in FIG. 4). Graph 600 includes an x-axis 602 graduated in units of frequency and a y-axis 604 graduated in units of magnitude. An upper frequency limit 606 defines an upper limit of a frequency region 608 and a lower frequency limit 610 defines a lower limit of frequency region 608. A trace 612 illustrates the exemplary kernel shown in FIG. 1. The aliasing artifacts illustrated in FIGS. 2 and 3 are caused by high-frequency in the projection aliased back into the low-frequency component of the projection. The aliasing artifacts can be reduced by zeroing out such aliased frequencies. A trace 614 illustrates an exemplary kernel capable of zeroing out the aliased high frequencies that result in aliasing artifacts. Trace 614 illustrates a kernel capable of zeroing out frequencies outside Nyquist region 608, while maintaining the kernel shape inside Nyquist region 608.

Mathematically, trace 614 is defined by:

$$K(f) = \Pi(f) \cdot G(f), \text{ where}$$

$\Pi(f)$ is a window function. The kernel illustrated by trace 614 preserves frequencies inside Nyquist region 608 and removes the high-frequency contents and facilitates suppressing the aliasing artifacts.

Compared to the "Edge" kernel illustrated in FIG. 1, images reconstructed using the kernel illustrated in FIG. 6 preserve the sharpness of the bony structure of the head. Additional examination shows that the inner ear bony structures are well preserved when viewing with a wider display window.

Because of the zeroed out of frequencies in the windowed kernel, the amount of computation can be significantly reduced. For example, for the exemplary kernel shown in FIG. 6, the forward FFT and multiplication with filter kernel can be obtained using approximately half of the computing power as it would using the "Edge" kernel illustrated in FIG. 1.

Figure 7:
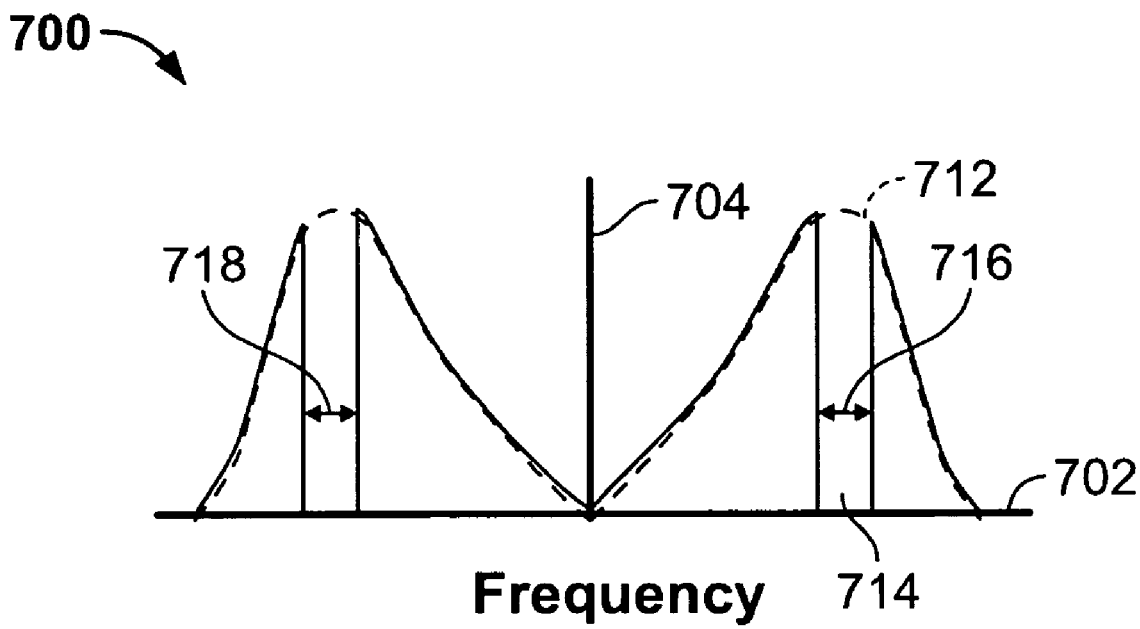
FIG. 7 is a graph of an exemplary image reconstruction kernel that may be used with the system shown in FIG. 4.

FIG. 7 is a graph 700 of an exemplary image reconstruction kernel that may be used with system 10 (shown in FIG. 4). Graph 700 includes an x-axis 702 graduated in units of frequency and a y-axis 704 graduated in units of magnitude. A trace 712 illustrates the exemplary kernel shown in FIG. 1. In the exemplary embodiment, a notch window 714 can be used such that only frequencies within a first predetermined window 716 of frequencies and a second predetermined window 718 of frequencies are removed, as illustrated in FIG. 7. The notch filter is designed based on the characteristics of the system to remove the most pronounced aliasing while maintaining other high frequency content.

In yet another embodiment, the window functions (both $\pi(f)$ and $G(f)$ in the equation) are determined dynamically based on the anatomy that is scanned. For example, when scanning an inner ear region, the upper limit of the window function is substantially near the Nyquist frequency of the system, since significant aliasing artifact is likely to result. When scanning the mid-brain region, the upper limit is substantially higher since it is known a priori that the probability of aliasing artifact is low. Additionally, the shape of the reconstruction kernel, $G(f)$, is different dependent on a reconstruction of the inner ear region or mid-brain region.

Figure 8:
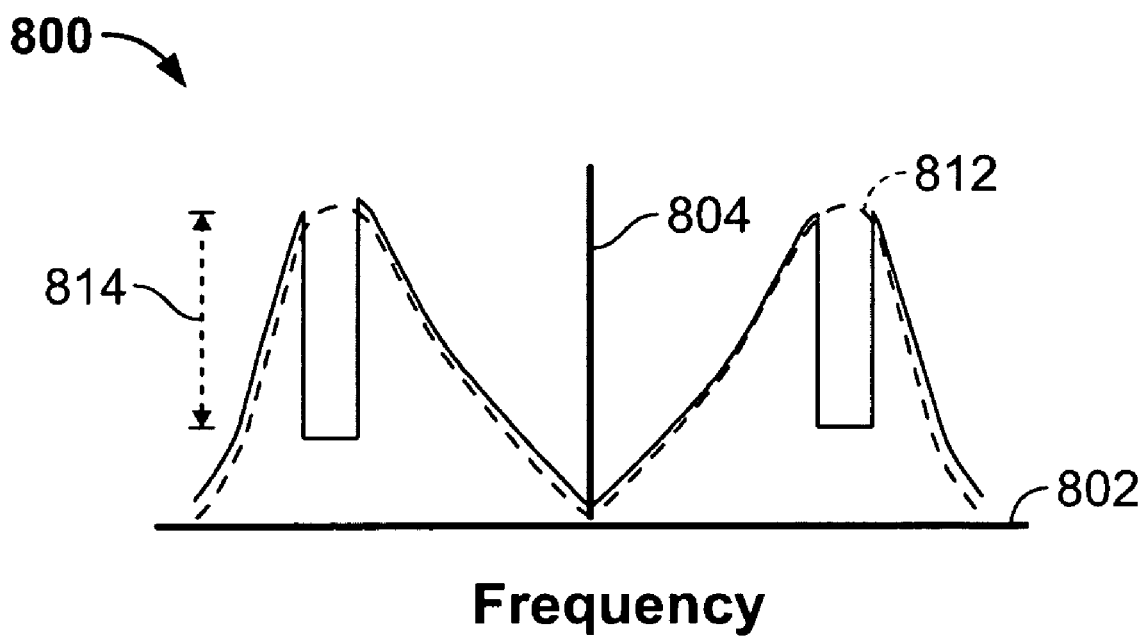
FIG. 8 is a graph of another exemplary image reconstruction kernel that may be used with the system shown in FIG. 4.

FIG. 8 is a graph 800 of an exemplary image reconstruction kernel that may be used with system 10 (shown in FIG. 4). Graph 800 includes an x-axis 802 graduated in units of frequency and a y-axis 804 graduated in units of magnitude. A trace 812 illustrates the exemplary kernel shown in FIG. 1. In the exemplary embodiment, a "depth" 814 of the window function (or notch filter) is changed. As described above with reference to FIG. 7, frequencies outside the frequency limit are set to zero. In the exemplary embodiment, frequencies outside the frequency limit are set to a relatively small value dependent on the desired outcome, as illustrated in FIG. 8. This is mainly determined automatically or by the user based on the balance of aliasing artifact and the "sharpness" of the resulting image.

In yet another embodiment, the window functions (both $\pi(f)$ and $G(f)$ in equation) change with the reconstruction parameters. For example, the upper limit of the window function (or the notch filter location and width) changes with the reconstruction FOV, taking into account the reconstructed pixel size.

In yet another embodiment, the window functions ($\pi(f)$ and $G(f)$) changes with the acquisition parameters. For example, the window functions can change with the helical pitch. It is known that at a low helical pitch (<1), more than $2\pi$ of projection data is available for the reconstruction of an image. Therefore, the reconstruction kernel $\Pi(f)$ and the window function $G(f)$ should include as much high frequency signal as possible to produce sharp images. When helical pitch increases (>1), the amount of high frequencies should be limited. For example, when helical pitch is between slightly larger than one, both window functions should reduce slightly in the high-frequency portion. However, when the helical pitch is significantly higher than 1, the upper limit of the frequency should be limited to near the Nyquist frequency to ensure aliasing free images.

In yet another embodiment, both functions should change with the "noise" level of the projection. When the noise level is high, the high frequency portion should be scaled back since the true high frequency signals are likely buried inside the noise and could not be observed in the reconstructed images. When the noise level is low, more high frequencies contents should be allowed in the window function.

Although the preceding embodiments are discussed with respect to medical imaging, it is understood that the image acquisition and processing methodology described herein is not limited to medical applications, but may be utilized in non-medical applications.

The description applying the above embodiments is merely illustrative. As described above, embodiments in the form of computer-implemented processes and apparatuses for practicing those processes may be included. Also included may be embodiments in the form of computer program code containing instructions embodied in tangible data storage device 38, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a propagated data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated.

The above-described embodiments of an imaging system provide a cost-effective and reliable means for facilitating removing aliasing artifacts from reconstructed images and reducing the computing power needed for image reconstruction. More specifically, windowing a kernel to limit frequency above and below a predetermined Nyquist value facilitates reducing aliasing artifacts in images and zeroing the frequencies facilitates reducing the computations needed to reconstruct the images. As a result, the described methods facilitate image reconstruction in a cost-effective and reliable manner.

Exemplary embodiments of imaging system methods and apparatus are described above in detail. The imaging system components illustrated are not limited to the specific embodiments described herein, but rather, components of each imaging system may be utilized independently and separately from other components described herein. For example, the imaging system components described above may also be used in combination with different imaging systems. A technical effect of the various embodiments of the systems and methods described herein include facilitating reducing aliasing artifacts in images.

While the invention has been described in terms of various specific embodiments, those skilled in the art will recognize that the invention can be practiced with modification within the spirit and scope of the claims.

What is claimed is:

1. A system for visualizing relatively small structures within an object, said system comprising:
   an image acquisition sub-system for acquiring a dataset for a volume of interest; and
   a processor for generating image data from the acquired data, said processor programmed to execute a high resolution filter kernel algorithm comprising a weighting factor applied to a ramp filter that scales relatively high frequency regions of the image dataset by a factor greater than one, and a windowing function applied to the weighted ramp filter that facilitates reducing aliasing artifacts in reconstructed images generated from the image dataset.

2. A system in accordance with claim 1 wherein said weighting factor is a polynomial weighting factor.

3. A system in accordance with claim 1 wherein said weighting factor is configured to enhance relatively high frequency contents of the image dataset during tomographic reconstruction.

4. A system in accordance with claim 1 wherein said windowing function is configured to reduce a magnitude of aliasing frequencies to substantially zero.

5. A system in accordance with claim 1 wherein said windowing function is configured to reduce a magnitude of frequencies outside a predetermined frequency region to substantially zero.

6. A system in accordance with claim 1 wherein said windowing function is configured to reduce a magnitude of frequencies inside a selectable range of frequency to a relatively small magnitude.

7. A system in accordance with claim 6 wherein said windowing function is configured to reduce a magnitude of frequencies inside a selectable range of frequency to substantially zero.

8. A system in accordance with claim 7 wherein said selectable range of frequency is at least one of automatically selectable and selectable by a user.

9. A system in accordance with claim 7 wherein said selectable range of frequency is selectable based on a portion of an anatomy of the object.

10. A system in accordance with claim 1 wherein said windowing function is configured to maintain a shape of the weighted ramp filter inside a predetermined frequency region.

11. A system in accordance with claim 1 further comprising an image acquisition portion for acquiring image data and a controller configured to control the image acquisition portion.

12. A system in accordance with claim 1 wherein the image acquisition portion comprises at least one of an X-ray modality, a CT modality, an ultrasound modality, a magnetic resonance imaging (MRI) modality, a positron emission tomography (PET) modality, a nuclear medicine modality, an optical modality, and a combination of modalities.

13. An imaging system comprising an image acquisition portion for acquiring data, a controller configured to control the image acquisition portion, and a processor configured to receive a dataset for an object that includes relatively small structures, said processor further programmed to:
process the dataset using a high resolution filter kernel algorithm comprising a weighting factor applied to a ramp filter that scales relatively high frequency regions of the image dataset by a factor greater than one, and a windowing function applied to the weighted ramp filter that facilitates reducing aliasing artifacts in reconstructed images generated from the image dataset.

14. An imaging system in accordance with claim 13 wherein said image acquisition portion comprises at least one of an X-ray source, an ultrasound source, a magnetic source, a positron emission source, a nuclear source, an optical source, and a combination of said sources.

15. An imaging system in accordance with claim 13 wherein said weighting factor is a polynomial weighting factor.

16. An imaging system in accordance with claim 13 wherein said weighting factor is configured to enhance relatively high frequency contents of the image dataset during tomographic reconstruction.

17. An imaging system in accordance with claim 13 wherein said windowing function is configured to reduce a magnitude of aliasing frequencies to substantially zero.

18. An imaging system in accordance with claim 13 wherein said windowing function is configured to reduce a magnitude of frequencies outside a Nyquist region to substantially zero.

19. An imaging system in accordance with claim 13 wherein said windowing function is configured to maintain a shape of the weighted ramp filter inside a Nyquist region.

20. A method of visualizing relatively small structures within an object comprising:
receiving a dataset for a volume of interest; and
applying a high resolution filter kernel including a weighting factor and a windowing function to the dataset wherein the weighting factor is applied to a ramp filter that scales relatively high frequency regions of the dataset by a factor greater than one and wherein the windowing function is applied to the weighted ramp filter such that aliasing artifacts in reconstructed images generated from the image dataset are facilitated being reduced.

21. A method in accordance with claim 20 wherein applying a high resolution filter kernel including a weighting factor and a windowing function to the image dataset comprises applying a high resolution filter kernel including a polynomial weighting factor.

22. A method in accordance with claim 20 wherein applying a high resolution filter kernel including a weighting factor and a windowing function to the image dataset comprises applying a high resolution filter kernel including a weighting factor that is configured to enhance relatively high frequency contents of the image dataset during tomographic reconstruction.

23. A method in accordance with claim 20 wherein applying a high resolution filter kernel including a weighting factor and a windowing function to the image dataset comprises applying a windowing function that is configured to reduce a magnitude of frequencies outside a Nyquist region to substantially zero.

24. A method in accordance with claim 20 wherein applying a high resolution filter kernel including a weighting factor and a windowing function to the image dataset comprises applying a windowing function that is configured to maintain a shape of the weighted ramp filter inside a Nyquist region.

25. A method for reconstructing an image from a dataset for a volume of interest, the method comprising:
defining a reconstruction kernel by applying a window function to a filter kernel, the reconstruction kernel configured to substantially zero out frequencies outside of a Nyquist region associated with the filter kernel while maintaining the shape of filter kernel inside the Nyquist region; and
applying the reconstruction kernel to the dataset.

26. The method of claim 25, wherein:
the filter kernel comprises an edge kernel configured to scale relatively high frequency regions of the dataset by a factor greater than one, thereby enhancing the relatively high frequency content of a projection of the dataset; and
the reconstruction kernel configured to preserve the frequencies inside the Nyquist region while suppressing aliasing artifacts associated with the zeroed out aliased high frequencies.

27. The method of claim 26, wherein:
the filter kernel comprises a weighting function applied to a ramp filter.

28. The method of claim 27 wherein the volume of interest comprises a bony structure of a patient, and further wherein:
in response to the applying the reconstruction kernel to the dataset, the sharpness of the bony structure is preserved.

29. The method of claim 28 wherein the bony structure comprises inner ear bony structure, the absence of the applying a window function enables reconstructed imaging on a display window of a first size, the presence of the applying a window function enables reconstructed imaging on a display window of a second size greater than the first size, and further wherein:

in response to the applying the reconstruction kernel to the dataset, the sharpness of the inner ear bony structure is preserved in the display window of the second size.

30. The method of claim 25, wherein the Nyquist region, being a function of Nyquist frequency, is symmetrically arranged with respect to a defined Nyquist frequency.

31. A computer program product comprising a computer readable medium having computer readable program code for implementing the method of claim 25.

* * * * *

UNITED STATES PATENT AND TRADEMARK OFFICE
CERTIFICATE OF CORRECTION

| | |
|---|---|
| PATENT NO. | : 7,653,230 B2 |
| APPLICATION NO. | : 11/358242 |
| DATED | : January 26, 2010 |
| INVENTOR(S) | : Jiang Hsieh |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1011 days.

Signed and Sealed this

Twenty-third Day of November, 2010

David J. Kappos
*Director of the United States Patent and Trademark Office*